Aug. 6, 1946.　　O. KYLIN ET AL　　2,405,435
MACHINE TOOL
Filed March 20, 1943　　3 Sheets-Sheet 1

OSKAR KYLIN
HENRIK O. KYLIN   INVENTORS
MICHAEL L. VALENTINO
BY
*Hawgood Van Horn*
ATTORNEYS

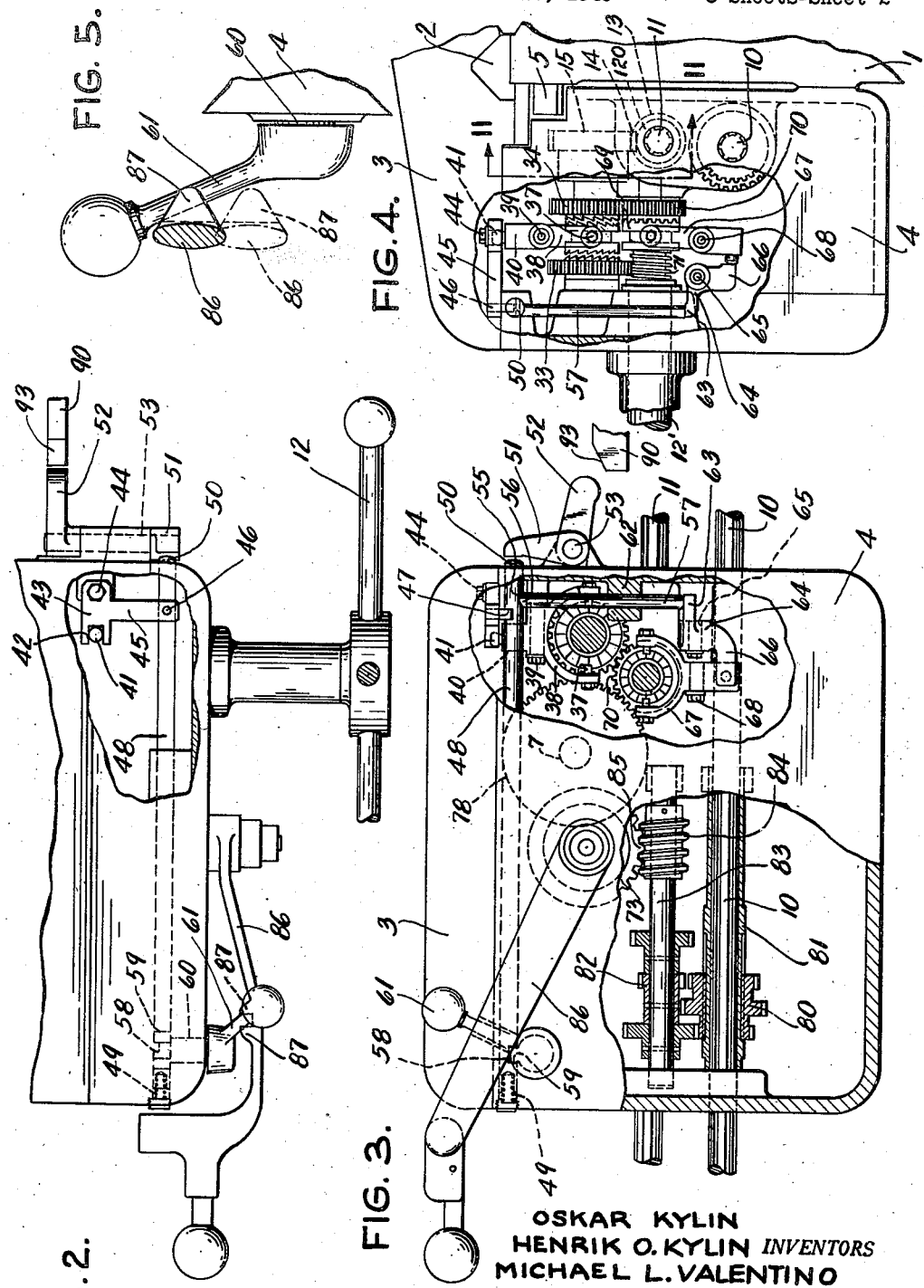

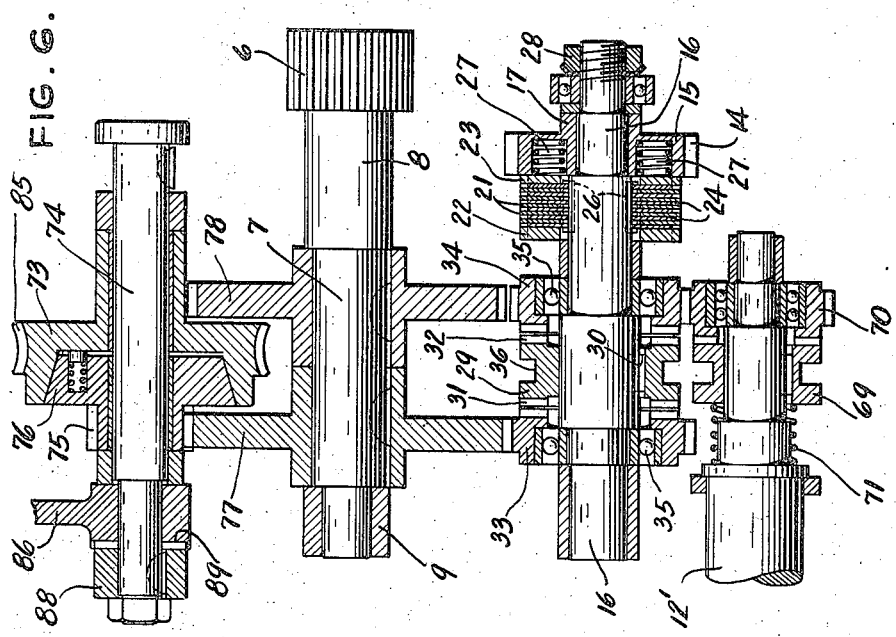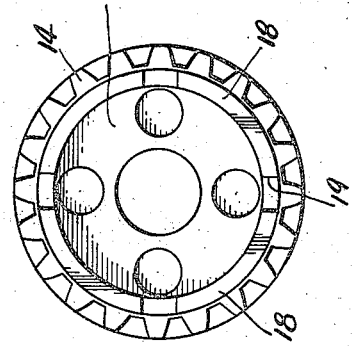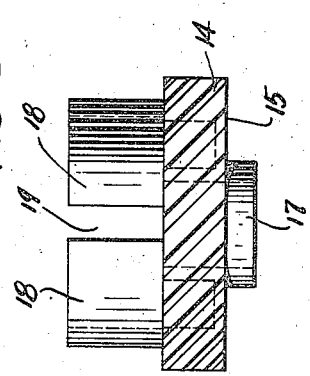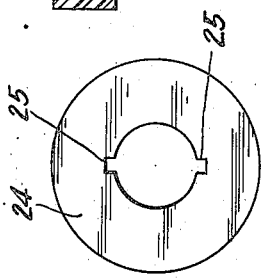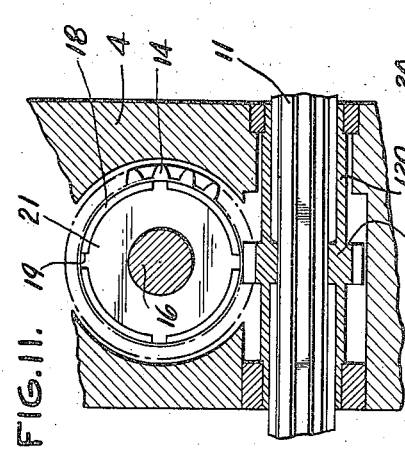

Patented Aug. 6, 1946

2,405,435

UNITED STATES PATENT OFFICE 2,405,435

MACHINE TOOL

Oskar Kylin, Henrik O. Kylin, and Michael L. Valentino, Cleveland Heights, Ohio, assignors to Bardons and Oliver, Inc., Cleveland, Ohio, a corporation of Ohio Application March 20, 1943, Serial No. 479,868

2 Claims. (Cl. 82—22)

Our invention is an improvement in machine tools and more particularly relates to power actuated means for reversing and rapidly traversing a slide on a machine bed.

One of the objects of the invention consists in the provision of means for feeding a slide member along a machine bed in performing a work operation and means operable by the feeding means for rapid traversing the slide member at the conclusion of the feeding operation.

Another object of the invention is to provide in a machine tool having a member slidable along a machine bed, power operated means by which the member may be fed during a working operation and then automatically rapid traversed in an opposite direction.

Another object is to provide mechanisms whereby the slide member may be fed along the machine bed during a working operation and engaged with means for automatically disengaging the feed and imparting a rapid traverse movement to the slide in a reverse direction.

A further object of the invention consists in the provision of means for rapid traversing a slide member toward an end of a machine bed and means for automatically disengaging the rapid traversing means to bring the slide member to a stop without requiring attention on the part of the operator.

A still further object of the invention resides in the provision of means by which the power transmitted through the rapid traverse mechanism to the slide member may be varied by the operator.

Another object of the present invention is to reduce the operating hazards of a machine tool equipped with an automatic power driven slide traversing mechanism by providing means for automatically disengaging the manual traversing member, such as a hand wheel or turnstile, while power rapid traversing.

Another object of the invention is to provide a mechanism of the type described which is simple in construction and positive in operation.

Other objects and advantages of our invention will become more apparent from the following description of one embodiment of the same, reference being made to the accompanying drawings in which like reference characters are employed to designate like parts throughout the same.

In the drawings:

Figure 2 is a top view of the saddle partly broken away to illustrate the slide feed releasing means;

Figure 3 is a front view of the saddle gear box partly broken away to show the slide feed mechanism and the rapid traverse operating means;

Figure 4 is an end view of the saddle and gear box also broken away showing the feed and reversing clutches and clutch operating means;

Figure 5 is a side elevation of the rapid traverse controlling lever, showing the same interlocked with a portion of the feed control lever in solid lines, and free of the feed control lever when the latter is disengaged as shown in broken lines;

Figure 6 is a developed view showing the rapid traversing slip clutch and associated reversing means controlling the rapid traversing mechanism and also illustrates a form of means for engaging and disengaging the slide feed mechanism;

Figure 7 is a front view of the slip clutch housing member;

Figure 8 is a side view of the same;

Figure 9 is a front elevation of one of the clutch discs;

Figure 10 is a front elevation of one of the cooperating clutch discs; and

Figure 11 is a section taken on line 11—11 of Figure 4.

Figure 1:
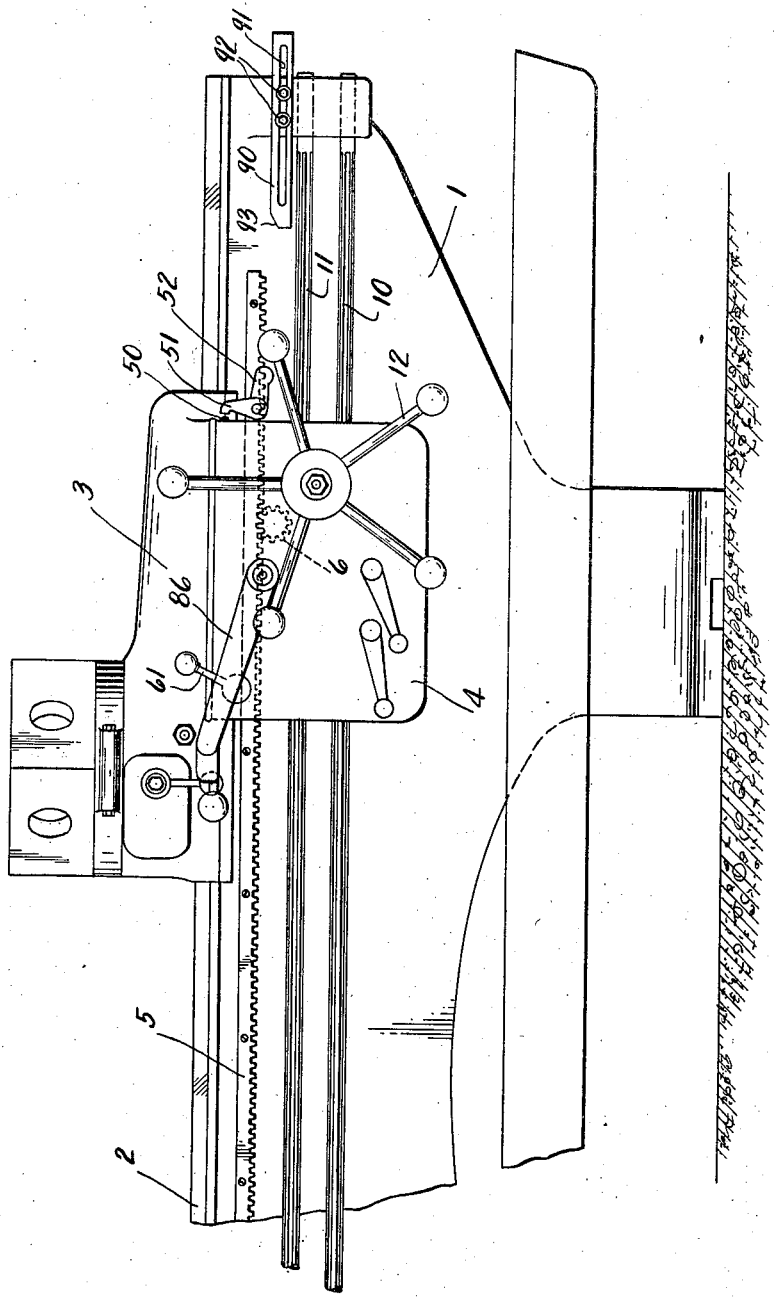
Figure 1 is a partial front elevation of a machine tool bed showing a form of the invention applied in use.

We have illustrated in the drawings an application of the invention to a turret lathe, although the same may well be applied to other machine tools having one or more slides.

The machine bed is indicated at 1 and is provided with the usual track members or ways 2 upon which the slide member and saddle 3 travels longitudinally of the bed. An apron and gear box 4 is carried by the saddle and overlies a side of the bed. A feed and rapid traverse rack 5 is provided longitudinally of the bed and a pinion 6 driven by suitable power means, which will be more fully described hereinafter, is in constant mesh with the teeth of the rack. The pinion 6 is keyed to a shaft 7 mounted in the supporting bearings 8 and 9 in the gear box or apron 4. Feeding power is delivered to the saddle 3 and attached gear box 4 from the driven feed shaft 10 while rapid traverse power is delivered to the saddle and gear box through the driven shaft 11. We have provided a turnstile or hand wheel 12 keyed to the shaft 12' for manually traversing the saddle and gear box along the bed in either direction.

Referring now more particularly to Figure 4 of the drawings it will be seen that the rapid traverse shaft 11 internally and slidably engages the sleeve 120 journalled in the gear box. The gear 13 is in mesh with the teeth of the gear 14, the axes of the gears 13 and 14 being disposed at substantially 90° to each other. The gear teeth 14 are formed on a rotatable clutch member 15 carried by the shaft 16 rotatably mounted in the gear box. This clutch member is provided with a boss or shoulder 17 on its rear side and is provided with spaced outer projecting plate housing walls 18 extending forwardly of the member. The spaces 19 between the adjacent walls 18 are arranged preferably diametrically of each other and receive the projections 20 of the clutch plates 21, 22 and 23 when the latter are assembled in the clutch member 15.

Alternating with the plates 21, are the clutch plates 24 which are provided with key slots 25 whereby they may be keyed to the shaft 16 by means of the keys 26. The power connection between the shaft 16 and the drive gear 14 is the friction between the clutch plates 21 and 24. Springs 27 are seated in the clutch member 15 and exert a force of compression outwardly against the plate 23 and, of course, the remaining clutch plates 21, 22 and 24, but in order to adjust or regulate this force or compression we have provided an adjustable lock nut 28 threaded on the rearward end of shaft 16. By tightening this nut on the shaft against the shoulder 17 of the clutch member the pressure against the respective clutch plates is increased through the springs 27 which are thus placed under greater compression.

Conversely, as this adjusting nut is withdrawn, the compression of the springs is relieved or lessened thus permitting less power to be transmitted through the clutch before slippage occurs.

Referring now more particularly to Figure 6 which is a developed view for the sake of greater clearness, a tooth clutch member 29 is slidably keyed at 30 on the shaft 16 and is provided with a forward tooth face 31 and a reverse tooth face 32. The forward tooth face 31 of the clutch member may be engaged with the forward clutch gear 33 to transmit forward rapid traverse motion to the saddle as will be described more fully hereinafter. Likewise, the reverse tooth face 32 of the clutch member 29 is engageable with the reverse clutch gear 34 to impart reverse rapid traverse motion to the saddle. Both of the clutch gears 33 and 34 are rotatable on the shaft 16 and are supported thereon by means of suitable bearings 35. The clutch member 29 is grooved peripherally at 36 to slidably receive the shoes or pins 37 carried by the clutch operating yoke lever 38 pivotally mounted at 39 in the gear box or apron 4 as shown in Figures 3 and 4. An arm 40 on the lever 38 terminates in a projection 41 which seats in a recess 42 in the lever 43 pivotally supported at 44 within the apron 4. The lever 43 has a portion 45 extending forwardly of the apron and carries a pin 46 which seats in a slot 47 formed in the bar 48. The bar 48 is slidably supported longitudinally of the apron 4 and abuts an adjustable compression spring 49 at one end which normally urges the bar to the right in Figures 2 and 3. The opposite end 50 of the bar projects through an opening in the apron into the path of movement of the arm 51 of the bell crank lever 52 pivoted at 53 on the outer end of the apron. The bar 48 is also provided at 55 with a V shaped notch near the end 50 into which the pointed end 56 of the shaft 57 seats. At its opposite end the bar 48 is slotted as at 58 to receive a stud or key 59 formed on the inner end of the shaft 60 operable by the handle or lever 61. Manual operation of the handle 61 a short distance in a counter clockwise direction from the neutral position shown in Figure 3 effects a rapid traverse power connection for the saddle in a forward direction, while movement of the handle 61 a short distance in a clockwise direction from the position shown in Figure 3 will effect a reverse rapid traverse power connection for the saddle as will be understood more clearly as this description progresses.

We also have provided means for controlling the power feed connection to the saddle. This means includes the rod 57 operating through a supporting member 62 and resting at its lower end upon an arm 63 of the lever 64 pivotally supported at 65 within the apron 4. Another arm 66 of the lever is adapted to engage or abut the lower end of a clutch yoke 67 pivoted at 68 and to move the sliding clutch member 69 out of engagement with the clutch gear 70 against the compression of the clutch spring 71 when the rod 57 is depressed. The teeth clutch member 69 and clutch gear 70 are thus disengaged during rapid traverse, but when the lever 67 is in neutral position and the upper end of the rod 57 is seated in the notch 55, as shown in Figure 3, the spring 71 exerts its force of compression against the tooth clutch member to engage it with the clutch gear 70 and thus provide a manual rapid traverse drive through the hand wheel or turnstile 12 in either direction.

The power feed shaft 10 has driving connection through a suitable selective speed transmission gearing and control means carried in the gear box to drive the cone clutch gear 73 rotatably mounted on the shaft 74 in the gear box. A clutch pinion 75 is rotatable on the shaft 74 with the cone clutch member 76 in mesh with the teeth of the forward feeding gear 77 keyed to the shaft 7 to drive the clutch gear 33. A second gear 78 is also keyed to rotate with the pinion shaft 7 and has a reverse driving connection through the gear 79 with the reverse clutch gear 34. This is clearly shown in Figures 3, 4 and 6.

We have not shown the selective gear transmission in the gear box in detail since any conventional form of sliding gear transmission may be used to obtain any one of several selected gear ratios in transmitting feeding power to the saddle from the feed shaft 10. Such power may be delivered through a gear 80 carried in the gear case and splined to slide along a sleeve 81 which in turn is splined to travel along the shaft 10 as the saddle and apron are traversed. This gear may be a single or multiple cluster slidable with respect to the gear box and the shaft 10 to engage and drive the selected gears of the cluster 82 on the driven shaft 83.

The worm 84 is in constant mesh with the worm gear 85 on the clutch member 73 to drive the pinion 75 through the cone clutch 73 and 76 when power is delivered to drive the shaft 83.

In this manner, power is delivered to the shaft 7 to drive the pinion 6 and thus traverse the saddle along the bed and rack 5.

The feed control lever is shown at 86 and engages and disengages the power feed to the apron and saddle at normal traverse. This lever has interlocking engagement with the rapid traverse lever 61 by means of the interlocking ears 87 spaced on the inner face of the lever arm as shown and which embrace the lever 61 as seen more clearly in Figure 2 when this lever is in neutral position and the lever 86 is in feeding position. By depressing the lever 86 to disengage the power feed the ears 87 will move downwardly and out of the path of movement of the inclined lever 61, thus permitting lever 61 to be moved for rapid traversing the saddle in either direction. But when the lever 86 is in an upward position to engage the power feed, the rapid traverse lever 61 must be in its neutral position and interlocked between the ears 87. In order that the feed clutch 73 and 76 may be disengaged when the lever 86 is depressed, we have provided a cam nut 88 having an inner cam face relatively slidable over a cam face 89 formed on the hub of the lever 86.

According to our invention, the slide may be rapid traversed in either direction along the bed by first disengaging the power feed to the shaft 7 by depressing lever 86 and then moving the lever 61 out of the neutral position in which it is shown. When forward rapid traverse is desired the lever is depressed in a counterclockwise direction toward the head stock of the machine, as shown, and when reverse rapid traverse is desired the lever is depressed in an opposite direction out of neutral. When this lever is depressed for forward rapid traverse, the rod 48 will be moved to the left in Figure 3 against the compression of the coil spring 49. Such movement of the rod 48 will shift the lever 45, Figure 2, in a clockwise direction about its fulcrum 44 and engage the forward clutch gear 33 with one face of the sliding clutch member 29 on the driven shaft 16. In this manner the drive from the shaft 11 will be through the gear 13, the slip clutch 15, shaft 16 and clutch members 29 and 33 to the gear 77 and shaft 7 to the pinion 6 and rack 5.

Reverse rapid traverse is obtained when the lever 86 is depressed and the lever 61 is shifted to its other extreme position to slide the rod 48 to the right in Figure 2. The lever 45 is moved in a counterclockwise direction in Figure 2 to shift the clutch yoke 38 rearwardly of the gear box and to engage clutch member 29 with the clutch gear 34. As power is transmitted from the driven rapid traverse shaft 11 through the slip clutch 15, and the clutch members 29 and 34, a reverse rapid traverse drive is completed through the gear 34 and the gears 70 and 78 rotate the shaft 7 and pinion 6 in mesh with the traversing rack 5.

When the operator is forwardly traversing the saddle, he moves the lever 61 forwardly as explained above but since the rod 48 is moved to the left against the compression of the spring 49, the lever 61 must be held in the forward position by the operator as long as the saddle is being rapid traversed in that direction. When the operator releases the lever 61 it returns to its neutral position automatically under the compression of the spring 49 to stop the forward motion of the saddle and slide, but when the operator moves the lever 61 to reverse or backward rapid traverse position he may release his control of the lever without interfering with the backward motion of the slide.

In order that the backward travel of the slide may be automatically stopped at any desired limit of travel in that direction, we have provided an adjustable stop or abutment member at 90. This member may be in the form of a bar slotted at 91 to receive one or more bolts 92 by which the bar is adjustably mounted on the machine bed. The forward end of the bar is inclined at 93 and extends directly into the path of movement of the lever arm 52 carried by the slide. When the arm 52 engages the stop 90 the rounded end of the arm will travel up the inclined wall 93 to rock the lever 54 into contact with the end 50 of the rod 48 which has been previously moved to the right by the setting of the lever 61 to back traversing position. The lever 54 thus pushes the rod 48 to the left in Figure 2 against the compression of the spring 49 to return the lever 61 and the clutch member 29 to neutral positions, thereby stopping the backward motion of the slide.

It will be noted that when the rod 48 moves either to the left or right in Figure 2 in forward or back rapid traverse positions respectively, the rod 57 will be depressed against the lever 64 against the compression of the spring 71 to disengage the clutch member 69 and the clutch gear 70. In this position the turnstile 12 will be ineffective to manually traverse the slide, and will not be rotated under power during traversing movement of the slide in either direction.

It will thus be seen that normal traverse of the saddle at slow speed cannot be obtained while the drive is through the rapid traverse mechanism and that the lever 61 must be returned to neutral position before the lever 86 may be moved upwardly to normal feed position. As soon as the lever 86 is in feeding position the ears 87 again embrace the lever 61 to retain it in its neutral position. With the lever 61 in neutral the pointed end 56 of the rod 57 is seated in the recess 55 of the rod 48 thus releasing the compression of the spring 71 to move the sliding clutch member 69 into driving engagement with the clutch gear 70. Manual feed in either direction may then be utilized by depressing the lever 86 to disengage the power slow feed.

From the foregoing, it will be observed that we have provided a relatively simple mechanism by which a tool or turret slide may be traversed either manually or by power, and in the latter case at any one of a plurality of rates, including rapid traversing in reverse directions and that any of these methods of traversing the slide may be readily and quickly selected and put into operation without damage to the several mechanisms because of carelessness of the operator. The invention provides a simplified form of control for traversing the slide and eliminates any possibility of danger to the operator while the slide is being rapid traversed in either direction, since the manual traversing turnstile is automatically disengaged during this operation.

Various changes may be made in the details of construction and arrangement of parts without departing from the spirit of the invention or the scope of the appended claims.

We claim:

1. In a machine tool, including ways, a driven feed shaft and a driven rapid traverse shaft, in combination with a slide movable along said ways and said shafts, of an apron comprising a gear box carried by said slide, a change speed gearing in said apron and having driven connection with one of said shafts, a positive reversible clutch having driven connection with said change speed gearing, a slip clutch cooperating with said positive clutch and having driven connection with said other shaft, manually operated means for feeding said slide in either direction, a clutch in said manual means, a rapid traverse control lever on said apron movable to a forward, neutral or reverse rapid traverse position, a feed control lever on said apron movable to engage and disengage the driven connection with said feed shaft, and means operable by said first named control lever to disengage the clutch in the manual feed means and to effect a driven connection through said positive clutch to said rapid traverse shaft when said lever is moved to either its forward or reverse rapid traverse position, said last named means including a bar slidable by said lever, a pivoted member within the apron operably associated with said reversing clutch and movable by the movement of said bar, and mechanism actuable by movement of said bar to operate said manual control clutch whereby, when said first named control lever is moved out of its neutral position, a rapid traverse drive is effected and said manual drive is rendered ineffective.

2. In a machine tool, including ways, a driven feed shaft and a driven rapid traverse shaft, in combination with a slide movable along said ways and said shafts, of an apron comprising a gear box carried by said slide, a change speed gearing in said apron and having driven connection with one of said shafts, a positive reversible clutch having driven connection with said change speed gearing, a slip clutch cooperating with said positive clutch and having driven connection with said other shaft, manually operated means for feeding said slide in either direction, a clutch in said manual means, a rapid traverse control lever on said apron movable to a forward, neutral or reverse rapid traverse position, a feed control lever on said apron movable to engage and disengage the driven connection with said feed shaft, and means operable by said first named control lever to disengage the clutch in the manual feed means and to effect a driven connection through said positive clutch to said rapid traverse shaft when said lever is moved to either its forward or reverse rapid traverse position, said last named means including a bar slidable by said lever, a pivoted member within the apron operatively associated with said reversing clutch and movable by the movement of said bar, and mechanism actuable by movement of said bar to operate said manual control clutch whereby, when said first named control lever is moved out of its neutral position, a rapid traverse drive is effected and said manual drive is rendered ineffective, said second control lever having means engageable by said first named lever when the latter is in neutral position and the former is in position effecting a driven connection through said feed shaft whereby to lock said first named lever in neutral position.

OSKAR KYLIN.
HENRIK O. KYLIN.
MICHAEL L. VALENTINO.